United States Patent [19]
Nenov et al.

[11] Patent Number: 5,935,407
[45] Date of Patent: Aug. 10, 1999

[54] METHOD FOR PRODUCING ABRASIVE TIPS FOR GAS TURBINE BLADES

[75] Inventors: Krassimir P. Nenov, Newnan, Ga.; Richard Fenton, Piermont, N.Y.; Joseph A. Fuggini, Tappan, N.Y.; Peter Howard, West Haverstraw, N.Y.

[73] Assignee: Chromalloy Gas Turbine Corporation

[21] Appl. No.: 08/965,559

[22] Filed: Nov. 6, 1997

[51] Int. Cl.⁶ .............. C23C 28/00; C25D 5/18; C25D 5/02; C25D 15/00

[52] U.S. Cl. ............ 205/183; 205/103; 205/110; 205/128; 205/134; 205/136; 205/149; 205/184; 205/228; 205/122; 205/109

[58] Field of Search .............. 205/103, 110, 205/128, 134, 136, 145, 146, 149, 184, 210, 219, 228, 122, 109, 183; 427/405, 455, 456

[56] References Cited

U.S. PATENT DOCUMENTS

| | | | |
|---|---|---|---|
| 779,639 | 1/1905 | Case | 205/110 |
| 3,061,525 | 10/1962 | Grazen | 204/9 |
| 3,152,971 | 10/1964 | Tomaszewski et al. | 204/41 |
| 3,830,711 | 8/1974 | Kedward et al. | 204/43 |
| 4,148,494 | 4/1979 | Zelahy et al. | 277/53 |
| 4,169,020 | 9/1979 | Stalker et al. | 204/16 |
| 4,214,355 | 7/1980 | Zelahy | 29/156.8 B |
| 4,222,828 | 9/1980 | Zuurdeeg | 204/16 |
| 4,227,703 | 10/1980 | Stalker et al. | 277/53 |
| 4,232,995 | 11/1980 | Stalker et al. | 415/172 |
| 4,249,913 | 2/1981 | Johnson et al. | 51/295 |
| 4,305,792 | 12/1981 | Kedward et al. | 204/16 |
| 4,608,128 | 8/1986 | Farmer et al. | 204/16 |
| 4,608,145 | 8/1986 | Fairbanks | 204/279 |
| 4,610,698 | 9/1986 | Eaton et al. | 51/295 |
| 4,744,725 | 5/1988 | Matarese et al. | 415/172 |
| 4,789,441 | 12/1988 | Foster et al. | 204/37.1 |
| 4,851,188 | 7/1989 | Schaefer et al. | 419/19 |
| 4,886,583 | 12/1989 | Martinou et al. | 204/16 |
| 5,037,513 | 8/1991 | Foster | 204/16 |
| 5,074,970 | 12/1991 | Routsis et al. | 205/122 |
| 5,076,897 | 12/1991 | Wride et al. | 205/110 |
| 5,355,637 | 10/1994 | Wiltshire et al. | 51/295 |
| 5,389,228 | 2/1995 | Long et al. | 205/110 |
| 5,389,229 | 2/1995 | Feldstein et al. | 427/304 |
| 5,558,758 | 9/1996 | Foster | 205/50 |
| 5,817,204 | 10/1998 | Tselesin | 156/230 |

FOREIGN PATENT DOCUMENTS

| | | |
|---|---|---|
| 1218179 | 1/1971 | United Kingdom . |
| 1329081 | 9/1973 | United Kingdom . |
| 1347184 | 2/1974 | United Kingdom . |
| 2182055 | 5/1987 | United Kingdom . |
| 9419583 | 9/1994 | WIPO . |

*Primary Examiner*—Bruce F. Bell
*Assistant Examiner*—Edna Wong
*Attorney, Agent, or Firm*—Mitchell D. Bittman

[57] ABSTRACT

A process is provided for producing an abrasive coating on a substrate surface by applying a bond coat by low pressure plasma spraying and anchoring to the bond coat abrasive particles by electroplating and embedding the particles into an oxidation resistant matrix by entrapment plating.

14 Claims, 6 Drawing Sheets

METHOD FOR PRODUCING ABRASIVE TIPS FOR GAS TURBINE BLADES

During the operation of a gas turbine engine, it is desired to maintain minimum clearance between the tips of the turbine blades and the corresponding seals. A large gap results in decreased efficiency of the turbine, due to the escape of high-energy gases. Conversely, friction between the blades and seals causes excessive component wear and wastes energy. Since aircraft turbines experience cyclic mechanical and thermal load variations during operation their geometry varies during the different stages of the operating cycle. It is therefore impossible to set the necessary minimum clearance at the time of assembly. Active clearance control and abrasive blade tips are currently used to establish and maintain optimum clearance during operation. Abrasive blade tips are used to enable the blades to cut their own path in the seals during the first few operating cycles of the engine. Ideally, those tips should retain their cutting action over many operating cycles compensating for any progressive changes in turbine geometry. The tips are usually comprised of an abrasive particulate phase such as cubic boron nitride (CBN), coated SiC, or another hard ceramic phase embedded in a suitable oxidation-resistant alloy matrix, such as MCrAlY, the M standing for either Ni or Co or both.

Various methods have been described in the art for applying an abrasive coating on an article. U.S. Pat. No. 4249913 describes an alumina coated silicon carbide particle dispersed in an alloy attached to the end of a turbine blade by diffusion bonding, liquid phase bonding or brazing. U.S. Pat. No. 4610698 describes a combination of sintering, plasma arc spraying, hot isostatic pressing and chemical milling to form an abrasive surface. U.S. Pat. No. 4227703 describes a process of bonding a discrete shaped alloy to the tip, then entrapping thereon abrasive particles with a matrix containing Cr, Co and Ni applied by electrodeposition.

A more recent method is described in U.S. Pat. No. 5076897 wherein a binding coat of MCrAlY is applied by electrodeposition, anchoring to the binding coat abrasive particles by composite electrodeposition and then plating an infill around the abrasive particles. This method is attractive due to its low cost and ease of manufacture; however, a problem with these abrasive tips is the low mechanical strength. This is due primarily to the weakness of the plated matrix and the interface between the plated matrix and the base alloy of the blade.

Thus an object of this invention is to provide a cost effective means of applying durable abrasive coatings with a strong bond between the substrate and the abrasive coating.

SUMMARY OF THE INVENTION

Briefly, the present invention provides a process for producing an abrasive coating on a substrate surface by applying a bond coat to the substrate surface by low pressure plasma spraying and anchoring to the bond coat abrasive particles by electroplating and embedding the particles into an oxidation resistant metal matrix by entrapment plating. More specifically, the coating is applied by: low pressure plasma spraying an $M_1CrAlX_1$, bond coat onto the substrate surface, wherein $M_1$ is one or more of Ni and Co and $X_1$ is one or more of Hf and Y; anchoring to the bond coat abrasive particles by electroplating from a bath of plating solution having abrasive particles contained therein; and entrapment electroplating an infill of $CrAlX_2$ or $M_2CrAlX_2$ powder around the abrasive particles from a bath of plating solution having $CrAlX_2$ or $M_2CrAlX_2$ particles contained therein, wherein $M_2$ is one or more of Ni and Co and $X_2$ is one or more of Hf and Y. An improved electroplating process and an improved abrasive coated substrate are also disclosed.

DETAILED DESCRIPTION OF THE INVENTION

The method of the present invention introduces several major innovations: i) a low pressure plasma spray (LPPS)-deposited base layer which serves as a transition between the base alloy and the plated tip matrix and greatly improves the mechanical strength of the tip, and which also provides residual protection to the blade following complete wear of the abrasive; ii) a plating setup consisting of an array of independent plating cells resulting in efficient powder suspension and uniform conditions around each of the blades during plating; iii) high concentration of metallic powder in the plating bath suspended with the help of chemical surfactants; iv) the blades only partially submerged in a small volume of plating solution, thus avoiding problems associated with unwanted solution penetration into the inner passages of the blades; and v) high-frequency reverse-pulse plating resulting in a dense and uniform entrapment of a large volume fraction of powder at a significantly higher rate than in the prior art.

This invention provides an improved method for the application of abrasive tips onto gas turbine blades by means of LPPS and entrapment plating. Typically, the blade tips produced by the method of the invention are comprised of a 0.002 inch to 0.003 inch thick oxidation-resistant MCrAlHf or MCrAlY LPPS base layer, and a 0.006 inch thick abrasive layer consisting of CBN abrasive particles embedded in a fully dense NiCrAlHf or NiCoCrAlHf oxidation-resistant metal matrix. The tips possess mechanical strength comparable to that of the previously known sprayed abrasive tips (see U.S. Pat. No. 4,610,698), but are easier and less costly to manufacture and are significantly stronger than entrapment-plated tips produced by methods of the prior art (see U.S. Pat. No. 5,076,897).

A bond coat is first applied to the substrate surface, eg. a gas turbine blade tip, by LPPS. This creates a dense, uniform layer essentially free of oxides or contaminants. Adhesion to the substrate is enhanced by a diffusion heat treatment after application. A suitable bond coat which provides strong adhesion between both the substrate surface and bond coat, as well as between the bond coat and the plated abrasive portion of the tip, while also providing protection to the substrate surface against wear, oxidation or erosion is a $M_1CrAlX_1$, bond coat, wherein $M_1$ is one or more of Ni and Co and $X_1$ is one or more of Hf and Y. A typical bond coat would be a NiCoCrAlY layer having a composition by weight percent of 32% Ni, 21% Cr, 8% Al, 0.5% Y, balance Co.

To apply the bond coat by LPPS the substrate surface is first prepared for the LPPS deposition by, for example, machining and cleaning the blade tip surface. Typically the surface is cleaned by grit blasting with alumina particles. Then, for example, a −325 U.S. Sieve Series Mesh powder, is applied by argon-helium plasma arc spraying in a low pressure chamber. The spray chamber is maintained at a pressure of about 40 Torr during spraying. The work piece blade is positioned with respect to the plasma arc device so that the tip cross section to be sprayed is normal to the axis along which the molten particles travel. The blade is suitably masked around its periphery so that errant spray does not deposit on the sides of the blade. The blade tips are preheated, for example to a temperature of approximately 1300° F., and the bond coat is applied at a thickness effective to act as a bond coat and provide protection to the substrate. A typical thickness for an $M_1,CrAlX_1$, bond coat is up to about 0.010 inches, preferably about 0.002 to 0.0003 inches thick.

Following the LPPS, the deposited bond coat is peened and heat treated to effect interdiffusion between the bond coat and substrate and to remove any voids in the coating, remove loose particles, reduce surface roughness and to relieve any residual stress in the deposit. Typically a NiCoCrAlY would be heated at about 1975° F. for about 2–4 hours under vacuum or a non-oxidizing atmosphere.

Figure 1:
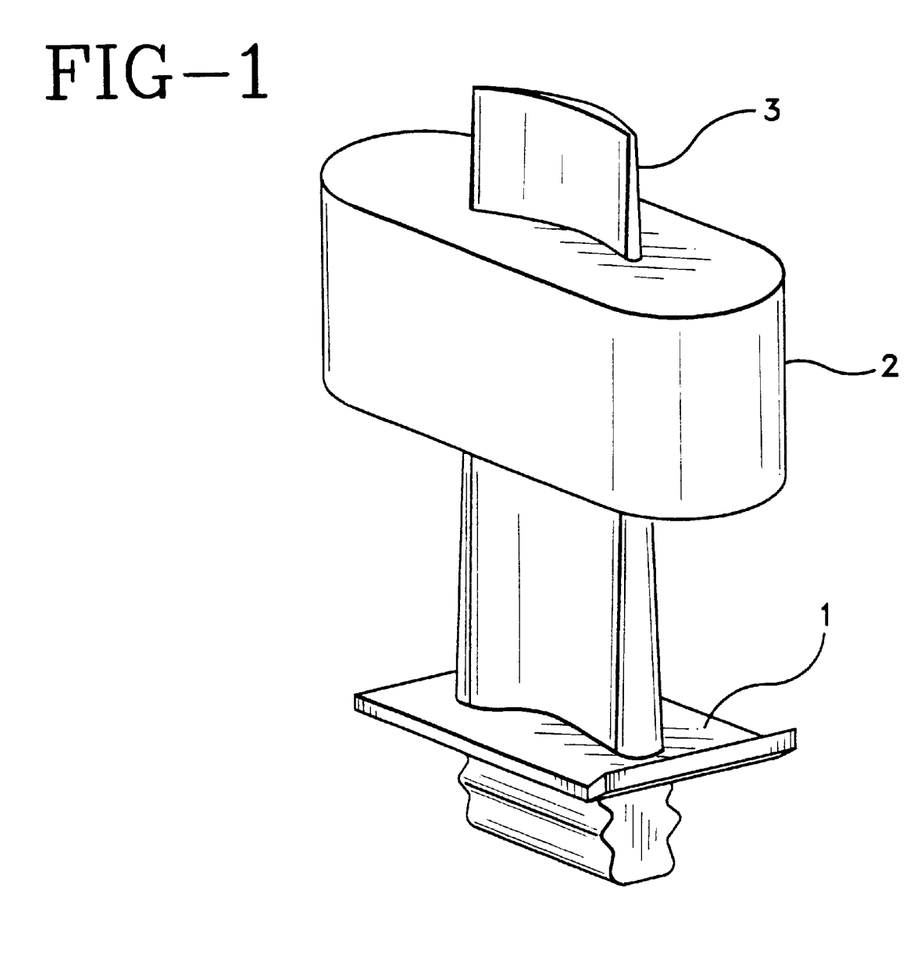
FIG. 1 shows a gas turbine blade secured in a mold.
Figure 2:
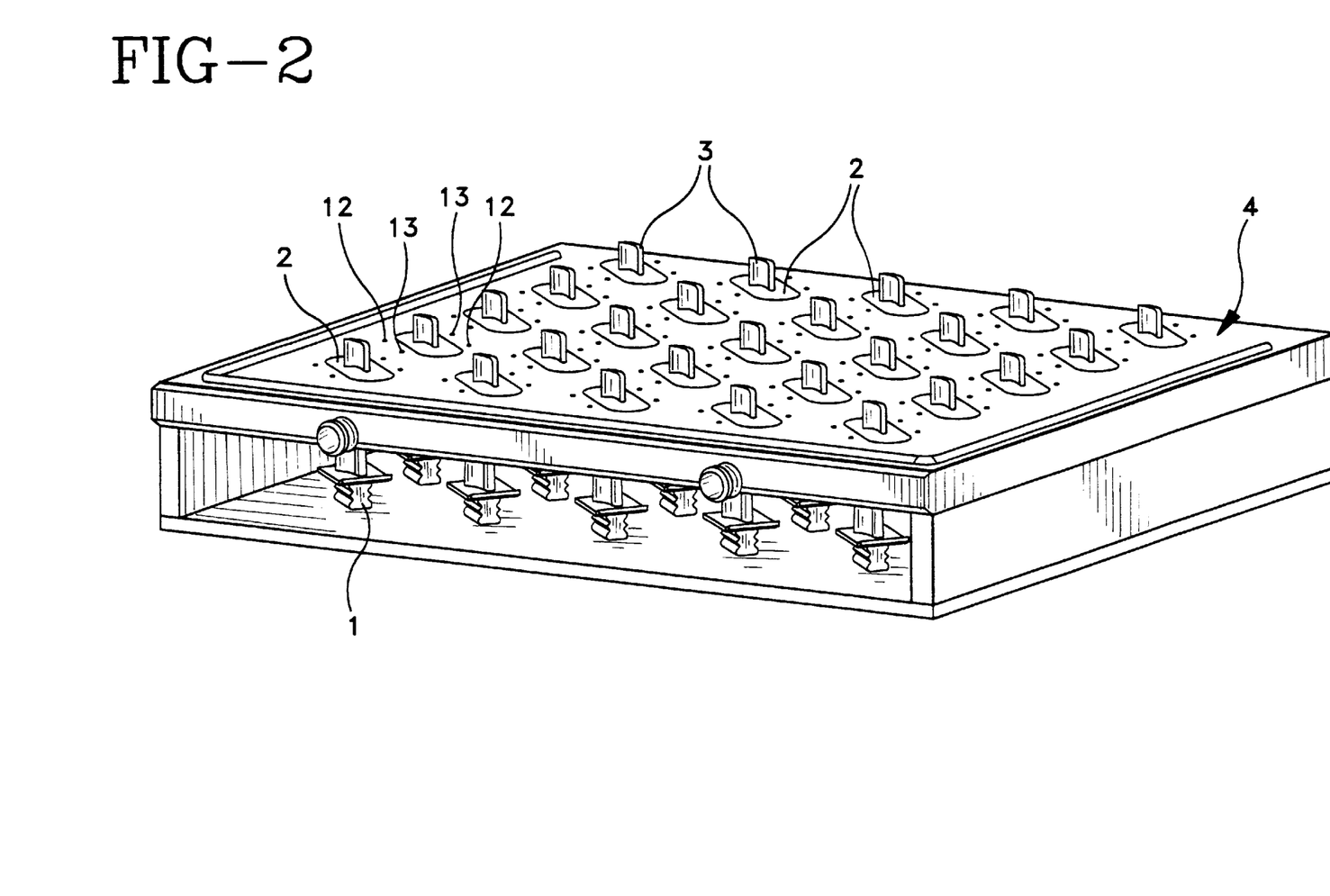
FIG. 2 shows an array of blades in a fixture base.

The bond coat is then prepared for plating. Surface oxides are removed by, for example, alumina grit blasting then cleaned, for example, by use of an alkaline cleaner to remove organic residues and an acid bath to etch the surface. This is followed by a strike bath containing Ni or Co to provide a highly active surface layer of metal for plating. For example, the cleaned surface is activated by means of a two-minute nickel sulfamate strike providing a 0.0001 inch thick layer of nickel. For the cleaning and subsequent plating operations the blades are masked. Preferably, as shown in FIG. 1, the gas turbine blade 1 is placed in a mold 2, typically of rubber or plastic, which surrounds the blade with only the tip of the blade 3 to be coated being exposed, which mold is integral with the fixture base 4 as shown in FIG. 2. This blade mold assists in preventing plating or cleaning of undesired areas and in securing the blade into the fixture base 4.

Following preparation of the bond coat surface, abrasive particles are anchored to the bond coat by tack plating. This is carried out by electroplating from a bath of plating solution having abrasive particles contained therein. Preferably, the particles are placed in direct and stable contact with the blade tip, and then electroplating around them a thin layer of Ni or Co. The abrasive particles are typically hard ceramic particles and can be, for example, CBN or SiC, with or without a metal coating. The preferred particle size of the abrasive particles for use in gas turbine blade tips is generally from about 4 to 7 mils. For example, 80–100 U.S. mesh uncoated CBN particles can be anchored with a 0.0004 inch thick nickel layer deposited from a nickel sulfamate plating solution having a nickel content of about 80 g/l.

Figure 3:
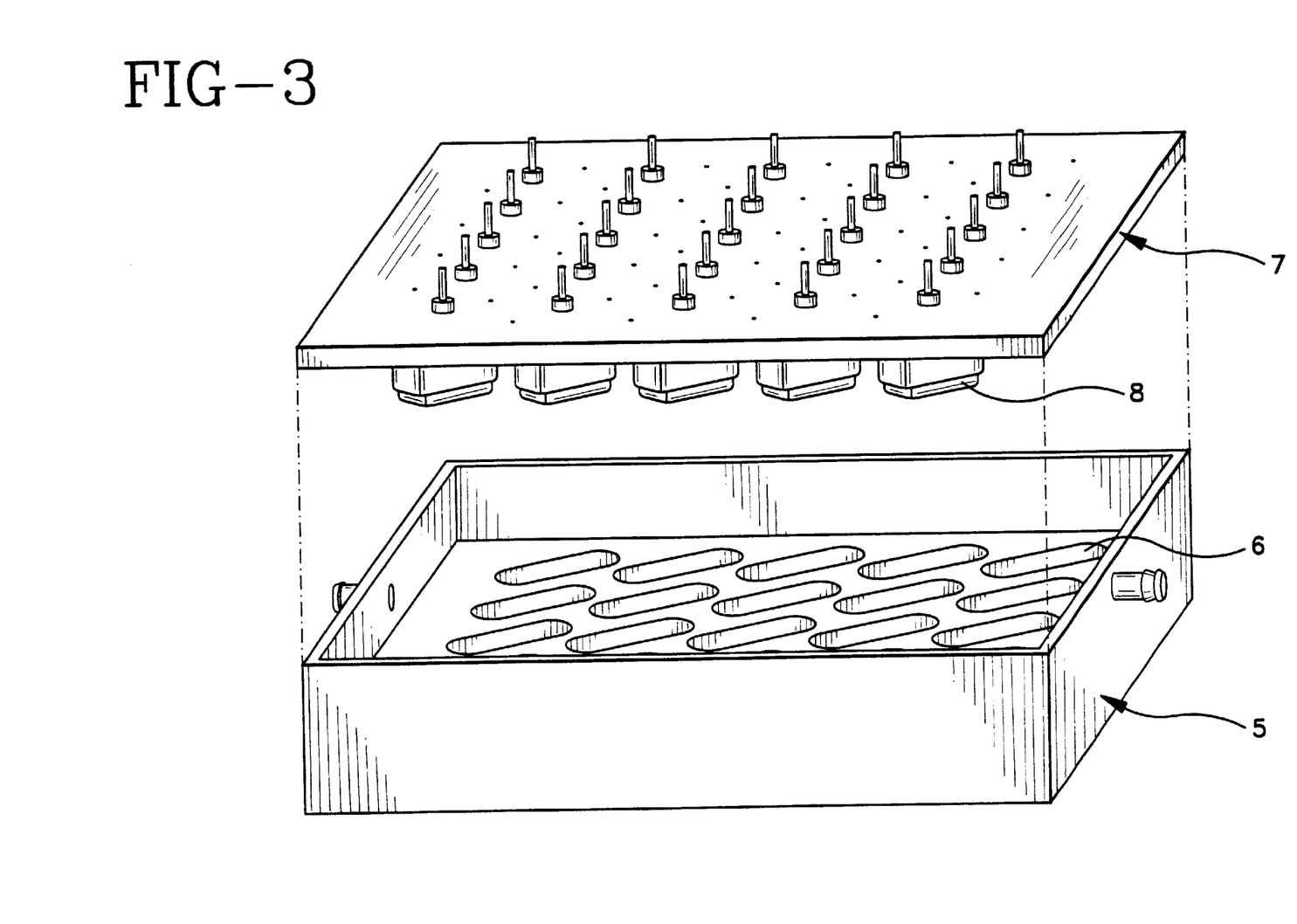
FIG. 3 shows an abrasive tack fixture and an anode array.

The abrasive tack plating is carried out by placing an abrasive tack fixture 5, shown in FIG. 3, on top of the fixture base 4 of FIG. 2. The tapered recesses 6 in the abrasive tack fixture 5 fit around the turbine blade tips 3 and serve to direct the abrasive particles into pockets which extend to the blade tips 3 and maintain the abrasive particles in contact with the blade tips during the tack plating. The anode array lid 7 is attached to the abrasive tack fixture 5 and positioned above the blade tips 3 so that there is an anode 8 positioned in each tapered recess 6 above each blade tip 3 during the abrasive tack plating. To anchor the abrasive particles to the tip the assembled tack fixture is filled with plating solution and the abrasive particles are introduced into the recesses. The plating current is then turned on and the fixture is vibrated at a high frequency and low amplitude for several seconds to uniformly distribute the abrasive particles on the tip surface. A layer of plating of about 0.0003 to 0.0005 inches is generally desired to tack the abrasive particles to the bond coat.

Following the tack operation, the abrasive particles are embedded in a metal matrix by entrapment plating an infill of metal alloy powder from a bath of nickel or cobalt plating solution having the metal powder contained therein. Preferred metal alloy powders are a $CrAlX_2$ or $M_2CrAlX_2$ powder, wherein $M_2$ is one of Ni and Co and $X_2$ is one of Hf and Y. A fine $CrAlX_2$ or $M_2CrAlX_2$ powder have a size of 10 microns or less with a concentration of 500 to 2000 g/l in the plating solution is preferred. For example, CoCrAlHf powder (99% less than 10 microns) is entrapment plated in a nickel sulfamate solution. A surfactant is preferably used to disperse the powder in the plating solution, allowing for high concentrations of the powder in the plating solution without agglomeration or precipitation.

Figure 4:
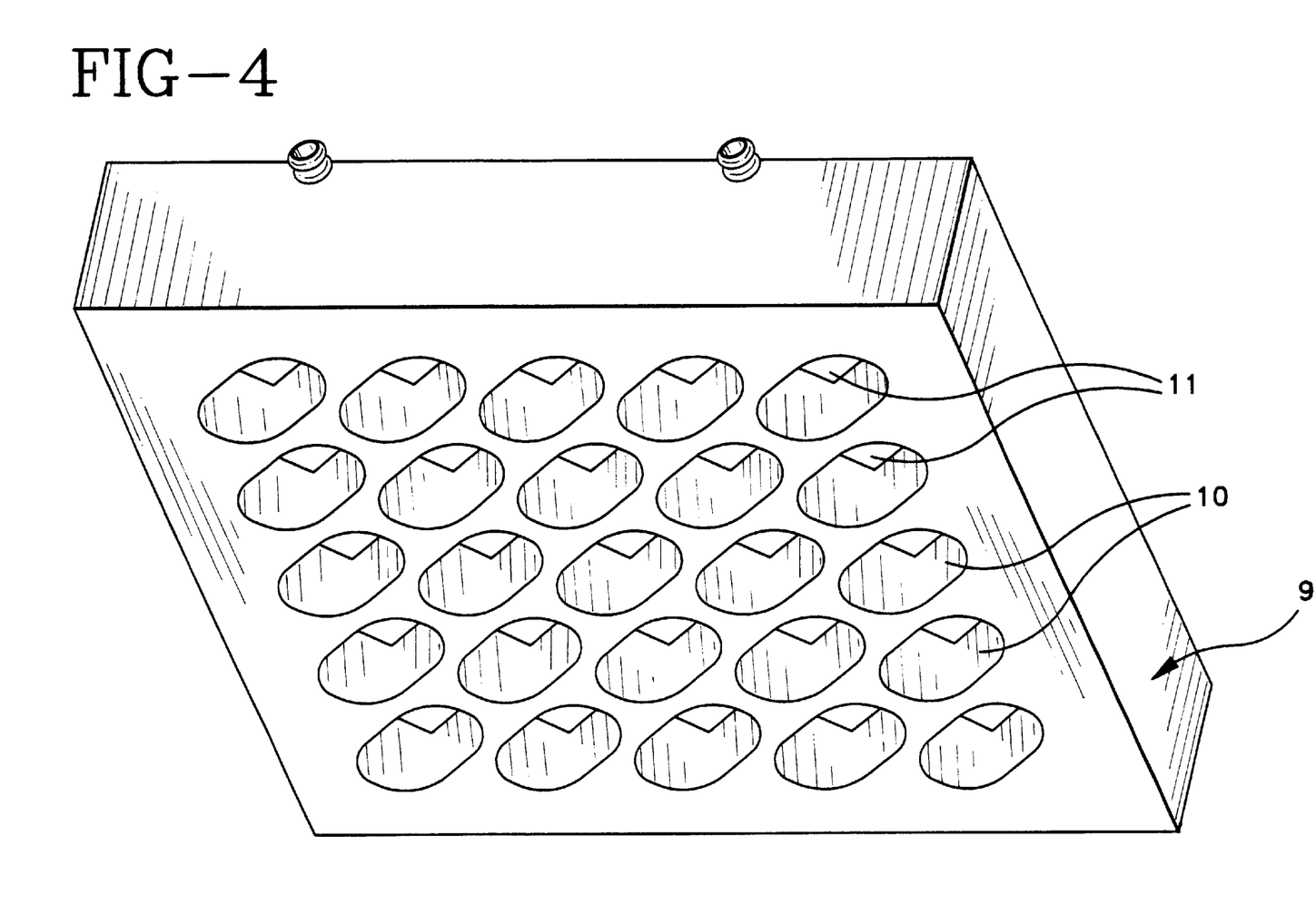
FIG. 4 shows an entrapment plating fixture.

Entrapment plating of the metal alloy powder is preferably carried out in an array of independent plating cells with a blade fixtured in each cell by placing the entrapment plating fixture 9 of FIG. 4 on top of the fixture base 4 of FIG. 2. The array can comprise any number of cells with from 20 to 40 cells per array being typical for aircraft turbine blades. An array of 25 blades is shown in FIG. 2. Each of the blade tips 3 in the fixture base 4 fits into a corresponding plating cell 10 of the entrapment plating fixture 9 shown in FIG. 4. Individual anodes 11 are affixed to plastic spacers near the top of each cell 10 and upon filling of the cells become fully submerged in the plating solution. Vent holes in the top of each cell permit the escape of entrapped air during filling. Following assembly of the fixture base 4 and plating fixture 9 each blade tip 3 becomes enclosed in its own independent cell. During plating, the powder-laden plating solution is recirculated in a closed circuit through the inlet ports 12 and outlets ports 13 located in the fixture base 4 at the bottom of each enclosed independent plating cell. The fixture is vibrated at 30–35 Hz by means of an electromechanical vibrator. The vibration frequency controls the length of time that the powder particles remain in contact with the blade tip surface and controls the fraction of entrapped powder in the coating as well as assists in providing a uniform distribution of entrapped powder particles. In addition the plating current density and waveform is important to providing suitable plating. Preferably the waveform contains short duration high amplitude reverse current pulses which help to remove loosely adherent particles, prevent nickel or cobalt depletion in the boundary layer, improve coating uniformity, and increase the throwing power of the solution. The reverse current pulse is generally repeated at least once every second, preferably a series of reverse current pulses is repeated once every 0.1 seconds.

Following plating the coated blades are heat treated to diffuse the $CrAlX_2$ or $M_2CrAlX_2$ powder composition into the plating metal matrix creating a dense homogeneous matrix for the abrasive particles. A typical heat treatment is at about 1975° F. for 4 hours. Additional treatments of the abrasive coated tip could include coating, such as a diffusion aluminide coating, to further improve the oxidation resistance of the abrasive coated tip.

Figure 5:
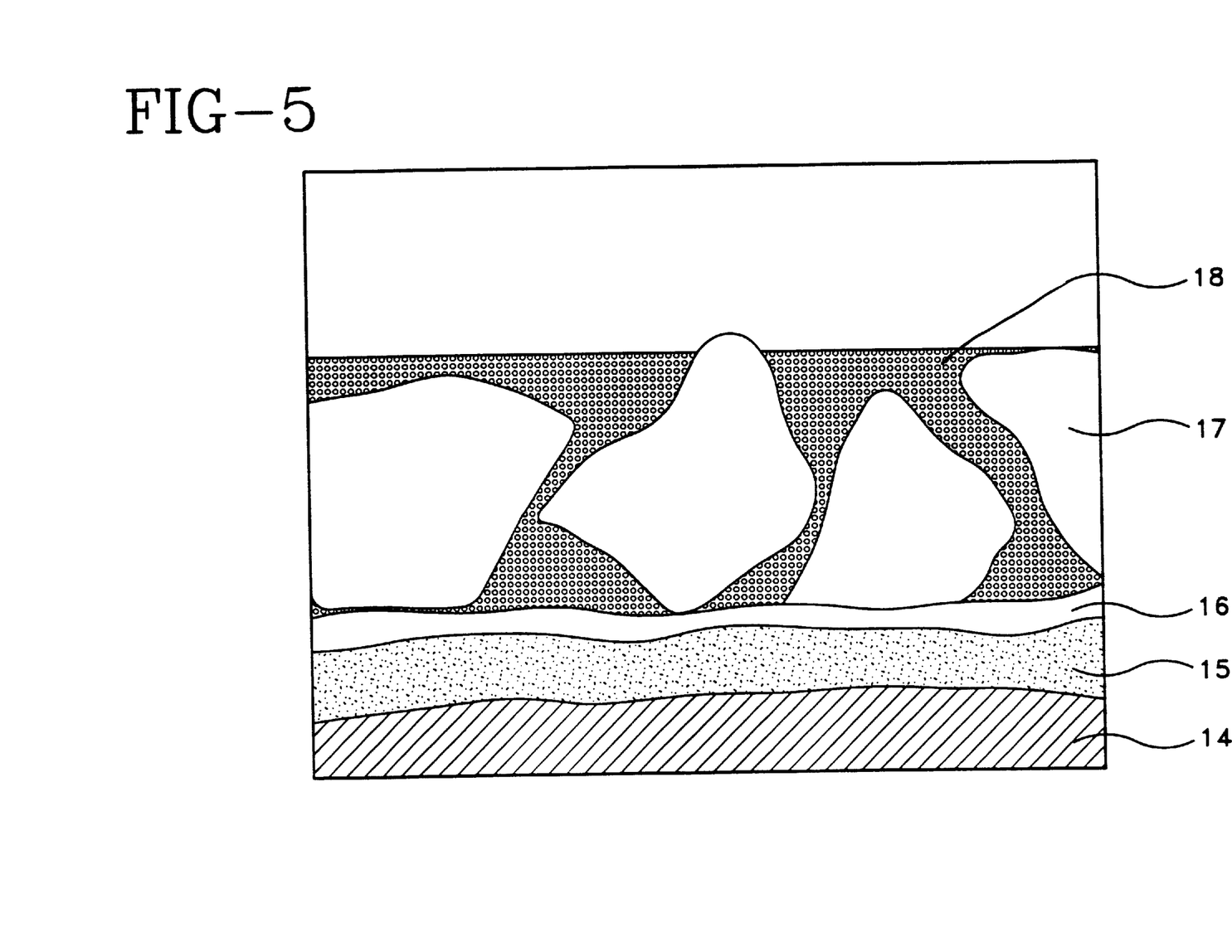
FIG. 5 shows schematically the structure of the abrasive coating adhering to the surface of the substrate prior to a final heat treatment.
Figure 6:
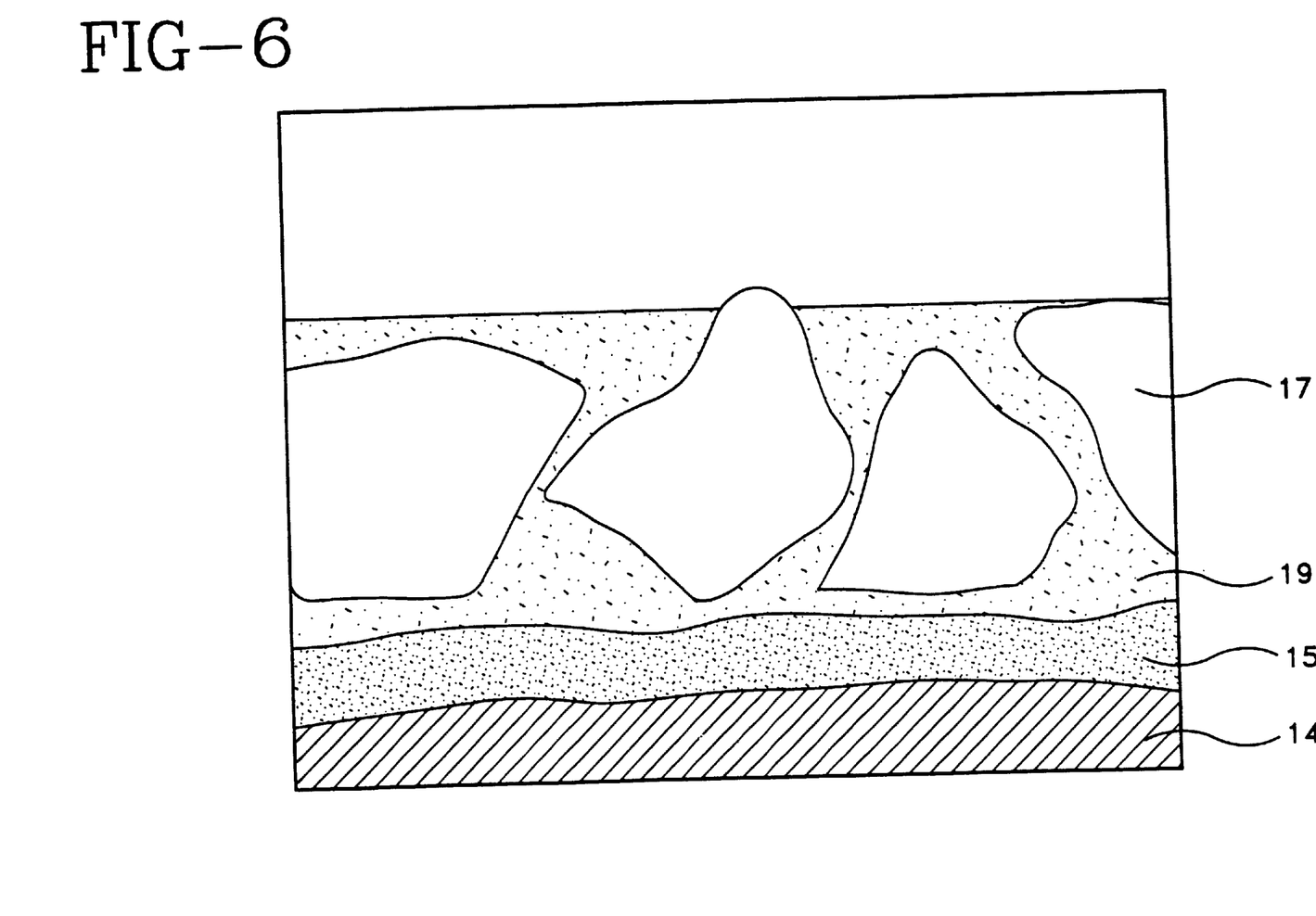
FIG. 6 shows schematically the structure of the abrasive coating after a final heat treatment.

A schematic of the abrasive coated surface produced by this invention before a final heat treatment is shown in FIG. 5. The substrate surface 14 has a LPPS layer of bond coat 15 thereon with a layer of nickel 16 and abrasive particles 17 adhering thereto and an infill 18 surrounding the abrasive particles. After heat treatment as shown in FIG. 6 the $CrAlX_2$ or $M_2CrAlX_2$ powder and nickel plating become a homogenous phase 19 surrounding the abrasive particles 17.

A major advantage of the process of this invention in the use of a LPPS bond coat is the mechanical strength and integrity it provides. The LPPS bond coat serves as a transitional zone between the plated matrix and the turbine blade substrate. The bond coat acts as a compliant interlayer, absorbing the stresses and dimensional changes associated with the electroplated deposit and more importantly the changes associated with engine operation. This bond coat also has a micro-rough surface resulting in a larger interface between the bond coat and the electroplated matrix. The increased surface area and resultant enhanced interdiffusion result in a greater bond strength of the abrasive tip. In addition the bond coat provides closer compatibility with the composition of the entrapment matrix. This coating also provides improved oxidation and hot corrosion resistance. The bond coating provides environmental protection to the tip, as it remains intact as the abrasive portion of the tip wears and degrades. This process and coating also provide compositional flexibility. The composition of the bond coat can be readily adjusted to optimize for long term substrate compatibility, creep strength, oxidation and/or hot corrosion resistance. The bond coat can be doped with elements that enhance, by interdiffusion, the environmental resistance of the entrapment matrix, eg. Hf, Y, Pt, Al.

EXAMPLE I

The blade tips of a gas turbine blade are machined to prepare for the LPPS deposition. A 0.0025 inch thick NiCoCrAlY layer is deposited by low pressure plasma spray. Following the LPPS application, the deposit is peened and diffused at 1975° F. for two hours.

The LPPS coated tips are then glass-honed and the blades are masked and placed into the mold in the plating fixture base. The fixture is assembled and the blade tips undergo a pre-plate cleaning process (alkaline and acid clean). The cleaned surfaces are activated by means of a two-minute nickel sulfamate strike at 90° F., 50 ASF.

Following the strike, the abrasive tack fixture is assembled onto the plating fixture base and filled with nickel sulfamate plating solution. 80/100 mesh CBN particles are introduced into each of the tapered recesses above the blades and the anode array lid is attached to the abrasive tack fixture. The assembled fixture is vibrated for a short time at a high frequency (100 Hz/10 seconds) at a low amplitude in order to distribute the CBN uniformly on top of the blade tips. CBN tack plating is carried out for 15 minutes at 30 ASF, resulting in a 0.0004 inch thick nickel tack layer. The assembled fixture is inverted and the plating solution is drained through a filter to recover the excess CBN material. Loosely adhered CBN particles are removed using a spray water rinse.

The abrasive tack fixture is disassembled and the entrapment plating fixture is assembled onto the fixture base in order that a plating cell is positioned on top of each blade tip. The assembled fixture is placed on a vibrating mount and vibration is commenced at 33 Hz. The pulsing rectifier is turned on and the plating bath made of a nickel sulfamate plating solution with additions of 0.67 v % of a surfactant and 500 g/l of ultra fine CrAlHf or CoCrAlHf powder (100%-15 micron, 99%-10 micron) is introduced by means of pumps into the plating cells from a storage/overflow tank.

The solution enters the plating cells via the bottom inlet ports. To completely remove any entrapped air the entrapment plating bath is recirculated for several minutes through the vent holes and the storage tank while the bottom outlet ports remain closed or only partially open. Subsequently, the cell bottom outlet ports are opened and the air bleed holes are closed and the solution is recirculated in a closed circuit for the remainder of the process at a rate required to maintain a minimum velocity of 30 cm/s throughout the system. The total volume of recirculated plating solution depends on the number and size of the blades to be plated and is typically between 1 and 2 gallons for 20 to 40 blades. The temperature of the solution is maintained at 120° F. Entrapment plating is conducted for 210 minutes under current control at 30 ASF equivalent DC current density using the following pulsing cycle: 80 ms forward current at 47 ASF followed by 5 cycles of 1 ms/140 ASF reverse pulse and 3 ms without current. The powder fraction entrapped by this process is 40% by volume of the entrapment plated coating.

The blades are removed from the fixture and unmasked, and placed in a vacuum furnace for a four hour diffusion process at 1975° F. At the end of the process, the CrAlHf or CoCrAlHf powder particles are entirely dissolved in the nickel matrix producing a metal matrix composite of CBN particles embedded in a 100% dense NiCrAlHf or NiCoCrAlHf alloy.

EXAMPLE II

The abrasive coated blade tips prepared by the process of this invention as demonstrated in Example I were subjected to a tensile strength test against blade tips with an abrasive coating prepared in accordance with U.S. Pat. No. 5,076,897 wherein a bond coat of MCrAlY is applied by electrodeposition, followed by electrodeposition of abrasive particles with an MCrAlY infill around the abrasive particles and diffusion heat treatment.

The equipment utilized was an Instron 60 kpf tensile testing machine. Tips prepared by the process of Example I and by the process of U.S. Pat. No. 5,076,897 were epoxied or brazed (Au-Ni) to 1 inch diameter steel pull bars. The test conditions were room temperature and a constant strain rate of 0.05 inches/min.

The result was that the tip prepared by the process of U.S. Pat. No. 5,076,897 had a strength of 4.7 ksi. The failure locus was cohesive within the entrapment plated matrix and adhesive by delamination of the interface between the base alloy of the blade tip and the plated matrix. The tip prepared by Example I had a strength of 27 ksi. The failure locus was adhesive by delamination of the LPPS/ entrapment plated matrix interface.

What is claimed:

1. A process for producing an abrasive coating on a substrate surface comprising:

applying a bond coat to the substrate surface by low pressure plasma spraying;

anchoring to the bond coat abrasive particles by entrapment plating in a metal matrix.

2. Process of claim 1 wherein an $M_1CrAlX_1$ bond coat is applied by the low pressure plasma spraying, wherein $M_1$ is one or more of Ni and Co and $X_1$ is one or more of Y and Hf;

the abrasive particles are anchored to the bond coat by tack plating; and an infill of $CrAlX_2$ or $M_2CrAlX_2$ powder is electroplated around the abrasive particles from a bath of plating solution having the $CrAlX_2$ or $M_2CrAlX_2$ powder contained therein, wherein $M_2$ is one or more of Ni and Co and $X_2$ is one or more of Y and Hf.

3. Process of claim 2 wherein the electroplating is carried out with the plating solution containing one or more of Ni and Co.

4. Process of claim 3 further comprising heat treating the infill electroplated substrate to diffuse the $CrAlX_2$ or $M_2CrAlX_2$ powder with the Ni or Co plating.

5. Process of claim 3 wherein the bond coat surface is cleaned and the surface activated for electroplating with a strike containing one or more of Ni or Co.

6. Process of claim 2 wherein the substrate is a nickel or cobalt based superalloy.

7. Process of claim 6 wherein the substrate surface is the tip of a gas turbine blade.

8. Process of claim 7 wherein the electroplating is carried out in an array of independent plating cells with one blade fixtured in each of the cells.

9. Process of claim 7 wherein the $CrAlX_2$ or $M_2CrAlX_2$ powder is dispersed in the bath of plating solution containing a surfactant.

10. Process of claim 9 wherein only the blade tip of the gas turbine blade is submerged in the plating solution during the electroplating.

11. Process of claim 10 wherein the electroplating is carried out with a reverse pulse current.

12. Process of claim 10 wherein the blade is placed in a mold leaving the blade tip exposed for plating.

13. Process of claim 9 wherein the $CrAlX_2$ or $M_2CrAlX_2$ powder is of a size of 10 microns or less and the concentration of powder in the plating solution is from about 500 to 2000 g/l.

14. Process of claim 7 wherein the abrasive particle is a cubic boron nitride (CBN) particle.

* * * * *